Figure 2:
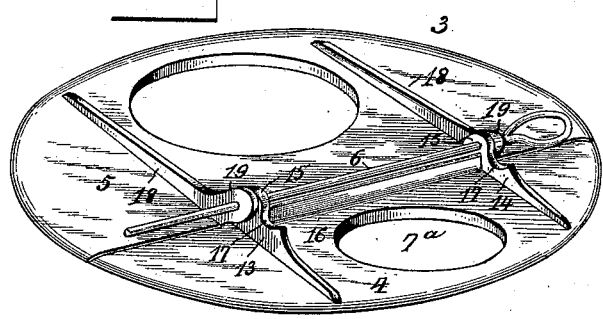

No. 615,836. D. FORD. Patented Dec. 13, 1898.
FEED COOKER.
(Application filed Nov. 22, 1897.)

(No Model.)

Witnesses
John F. Deafferwid
H. F. Bernhard

Inventor
David Ford.
By his Attorneys,
C. A. Snow & Co.

UNITED STATES PATENT OFFICE.

DAVID FORD, OF ALBION, MICHIGAN, ASSIGNOR OF ONE-HALF TO E. N. PARSONS, OF SAME PLACE.

FEED-COOKER.

SPECIFICATION forming part of Letters Patent No. 615,836, dated December 13, 1898.

Application filed November 22, 1897. Serial No. 659,432. (No model.)

*To all whom it may concern:*

Be it known that I, DAVID FORD, a citizen of the United States, residing at Albion, in the county of Calhoun and State of Michigan, have invented a new and useful Feed-Cooker, of which the following is a specification.

My invention relates to improvements in feed-cookers of that class designed to be placed inside of a barrel or cask and to be surrounded by the substance it is desired to heat—such, for example, as corn or feed to be supplied to stock or water for domestic purposes; and the object that I have in view is to provide an improved construction of a heater of this class by which provision is made for the proper supply of air below the grate to support combustion and for the exit of smoke and other products of combustion from the grate-chamber of the heater or cooker.

A further object of the invention is to construct and arrange the parts in a novel manner to enable ready access to be obtained to the grate-chamber for the purpose of supplying fuel to the cooker or heater; and a further object that I have in view is to provide novel means for securely holding or fastening the cooker or heater in position within a barrel or cask, which fastening means is readily accessible at all times, so that it may be manipulated to release the cooker or heater when it is desired to withdraw the same from the barrel or cask.

With these ends in view my invention consists in the combination, with a shell or cylinder and a grate in the lower part thereof, of a divided hinged cover fitted to the upper open end of the cylinder, an air-flue attached to one member of the cover and depending within the shell or cylinder to a point adjacent to the grate therein, and a smoke-pipe attached to the other member of said hinged cover to be normally sustained in an upright position thereby or to be folded into a substantially horizontal position when one member of the cover is raised to provide for access to the grate within the shell or cylinder of the cooker or heater.

The invention further consists of a cover provided with flanges forming seats, a transverse locking-rod fitted to said seats of the cover, and keepers attached to the barrel or cask and adapted to engage with the ends of said locking-rod in a manner to cause the latter to bind upon the cover and force it tightly upon the cylinder or shell of the heater, whereby the heater or cooker is maintained firmly in position within the barrel or cask; and the invention further consists in the novel construction and arrangement of parts, which will be hereinafter more fully described and claimed.

To enable others to understand my invention, I have illustrated the same in the accompanying drawings, forming a part of this specification, and in which—

Figure 1:
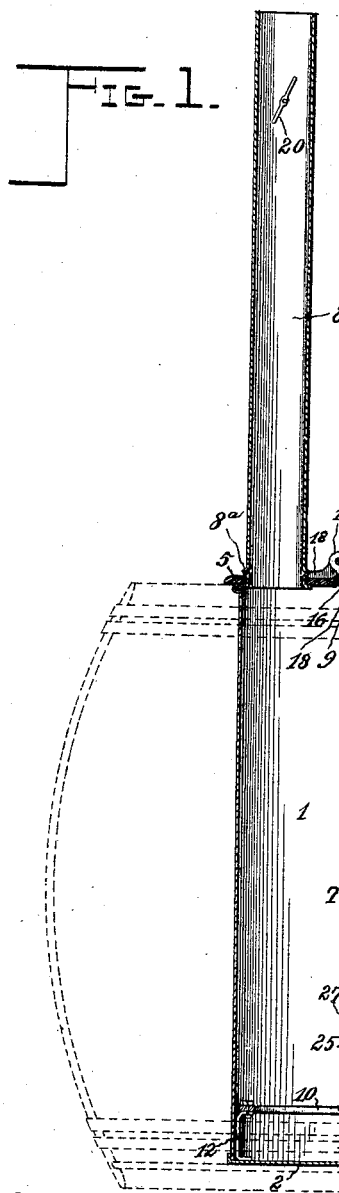
Figure 3:
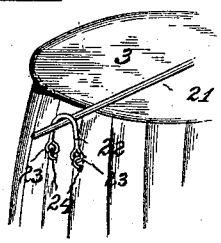
Figure 4:
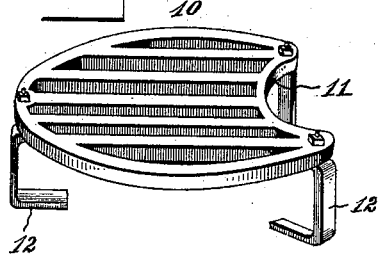

Figure 1 is a vertical sectional view through a feed cooker or heater constructed in accordance with my invention and illustrating the same positioned within a barrel or cask, the latter being indicated by dotted lines. Fig. 2 is a detail perspective view of the divided hinged cover for the cylinder or shell of the cooker. Fig. 3 is a view, partly in section, showing the means for holding in place the locking-rod that keeps the heater in position within a barrel or cask. Fig. 4 is a detail perspective view of the removable grate.

Like numerals of reference denote like and corresponding parts in each of the several figures of the drawings.

My improved cooker or heater consists of a vertical elongated cylinder or shell 1 open at its upper end and provided with a rigid bottom 2, which is united to the shell or cylinder in a suitable way preferred by a mechanic skilled in the calling. This cylinder or shell is imperforate throughout its length, and it is of a height proper to fit within a cask or barrel designed to contain the substance which is to be heated.

3 designates a divided sectional cover, which is fitted to the upper open end of the cylinder or shell 1 and which forms the supports for the depending air-tube 7 and the upwardly-extending smoke-pipe 8. Said cover 3 is divided on a substantially central line to form the two members 4 5, which are joined or connected together by a transverse hinged rod 6. The member 4 of the cover constitutes the normally stationary section, from which depends the air-flue 7, and said stationary member of the cover has a large opening 7ª formed therein through which passes the air-tube. I prefer to secure this air-tube to the stationary member 4 of the cover by bending or flanging said tube around the edge of the opening 7ª and by forming on the air-tube a bead 9, which is offset from the pipe and finds a seat against the lower face of the cover member 4. This air-tube passes downwardly into the shell or cylinder 1 for a suitable distance, but its lower extremity terminates above the bottom 2 of said cylinder.

In the lower part of the shell or cylinder of the heater or cooker is provided a removable grate 10, which is made of a size and form proper to fit within the cylinder 1, and to enable the air-pipe to extend below the fuel-surface of this grate it is provided with a curved recess 11, in which the lower extremity of the air-tube 7 is adapted to fit. The grate is preferably cast in a single piece of metal, and it is sustained in a raised position above the bottom of the cylinder by means of the short legs or standards 12, (shown as made separate from the grate proper and as bolted thereto;) but the detailed construction of the legs of the grate is not important, and the same may be varied as desired.

The stationary member or section 4 of the divided cover 3 is provided on its upper face with flanges or webs 13 14, which are made integral with said stationary cover member and are disposed on opposite sides of the air tube or pipe, where it opens through said member 4. These webs or flanges 13 14 are also provided within the line of the web or flange 16 with recesses 17, adapted to form seats for the transverse locking-rod to be presently described, and said stationary cover member 4 is further provided with the stop-lugs 18, that depend from the lower side or face of said cover member adjacent to its straight edge, said stop-lugs being adapted to fit within the upper edge of the cylinder 1 to prevent displacement of the cover laterally or horizontally on the said cylinder 1. The other member 5 of the divided cover is likewise provided with transverse webs 18, that terminate in lugs or ears 19, and said ears 19 are arranged to lap the lugs or ears 15 of the cover member 4, whereby the lapped ears of the respective cover members are adapted to receive the transverse hinged rod 6, which pivotally connects the cover member 5 to the other member 4.

The smoke pipe or tube 8 has a bead 8ª formed near its lower extremity, and said lower extremity of the tube or pipe is fitted in an opening of the cover member 5 to have its offset bead seated against the upper edge of the opening in said member 5, while the lower edge of the pipe or tube 8 is flanged to bear against the lower face of said member 5. This smoke pipe or tube communicates directly with the interior of the shell or cylinder, and it extends a suitable distance above the heater and the cask in which it is placed.

It will be observed that in my improved cooker or heater the cover sustains the air-supply tube and the smoke-exit tube, that the air-tube depends from the cover to a point below the level of the grate, and that the smoke tube or pipe rises above the heater, whereby a draft is secured through the air-tube below the grate and up through the heater-shell and the smoke-exit tube or pipe thereof.

Near the upper end of the smoke-pipe is provided a damper 20, which may be adjusted to regulate or check the draft through the heater.

21 designates a locking-rod arranged in a horizontal position to extend across the cask or barrel and the heater-cover. This locking-rod 21 fits in the seats formed by the recesses 17 on the stationary member 4 of the cover, and the ends of said locking-rod project beyond opposite sides of the cask or barrel to be engaged by the keepers 22. Each keeper consists of a bail, preferably bent from a single piece of wire into substantially the U shape shown by Fig. 3, and the legs of the bail are provided with the eyes 23, made by bending the extremities of the wire upon themselves. Through these eyes of the bail-like keeper are passed the staples 24, that fasten the keeper to the outside of the cask or barrel, and said bail is thus attached pivotally to the barrel in a manner to enable it to be turned upwardly into engagement with one end of the locking-rod or to be turned downward to free the locking-rod and permit the latter to be removed preliminary to detaching the heater from the cask or barrel. It will be understood that I provide two of these bails or keepers and that they are situated at diametrically opposite points on the outside of the cask or barrel for the purpose of having keepers which engage with opposite ends of the locking-rod, and these keepers are so positioned on the cask in relation to the locking-rod that the latter will be drawn or forced downwardly into tight engagement with the seats on the cover to depress the latter firmly upon the cylinder or shell 1, and thus confine the entire heater firmly in place within the cask or barrel.

In the practical manufacture of my improved heater I prefer to construct the cylinder, the air-supply tube, and the smoke-exit tube of sheet metal, while the grate and the cover are of cast metal. In using a sheet-metal air-tube in which the lower end is exposed to direct contact with the fire of the grate said extremity of the air-tube is liable to deteriorate under the action of the heat. To overcome this objection and to prolong the life and durability of the air-tube, I prefer to provide a metal jacket 25, which surrounds the lower extremity or foot of said air-tube. This jacket may be of heavy plate metal, bent into cylindrical form and fitted snugly around the foot of the air-tube 7, and said jacket and air-tube are united together in a suitable way—as, for instance, by the transverse rivets 27. (Shown by Fig. 1.)

In using my improved heater or cooker the cylinder or shell 1 is first placed in position within the barrel or cask to rest upon the bottom thereof and the grate is then deposited in the cylinder or shell. The cover is now placed upon the cylinder in a manner to have the lower extremity of the air-tube fit in the recess in the grate, and the stop-lugs on the cover member 4 engage with the cylinder 1 to prevent edgewise displacement of the cover on the cylinder.

Preparatory to starting a fire in the heater or cooker the cover member 5 is raised to lower the smoke-pipe 8, attached thereto, and thus expose to view that part of the cylinder containing the grate 10, after which fuel may be introduced into the heater, the cover member 5 lowered to rest upon the cylinder or shell 1, and the smoke-pipe 8 restored to its normal upright position.

The fuel on the grate may be ignited in any suitable way, and the heat generated thereby is radiated by the cylinder or shell for the purpose of heating the contents of the barrel or cask packed around the heater or cooker. The air necessary to support combustion is supplied from above the line of the contents of the barrel through the air-tube 7, that conducts the air below the grate, and the smoke and products of combustion are free to escape through the cylinder 1 and the smoke-pipe 8, that projects therefrom. The draft may be checked or controlled by proper adjustment of the damper in the smoke-pipe. When desired to replenish the supply of fuel on the grate, it is only necessary to lift the movable cover member 5, thus exposing the cylinder sufficiently to deposit the fuel upon the grate.

The locking-rod 21 is easily and quickly adjusted to the cover and fastened in fixed relation to the barrel to hold the heater steadily in place therein, and to remove the heater the bails or keepers are freed from the rod, the latter is detached, and the entire heater may then be withdrawn bodily from the barrel or cask.

It is evident that slight changes in the form and proportion of parts and in the details of construction may be resorted to without departing from the spirit or sacrificing any of the advantages of the invention.

Having thus described my invention, what I claim as new, and desire to secure by Letters Patent, is—

1. A feed-cooker comprising a cylinder, a two-part cover resting upon the cylinder and having its sections, 4, 5, hinged together and with the cover-section, 4, provided with the notched seats, a transverse locking-rod fitted upon said notched seats, holding devices adapted for attachment to a receptacle and arranged to engage with said holding-rods, an air-tube secured to the cover-section, 4, and depending within the shell, and a smoke-outlet pipe, 8, attached to the cover-section, 5, and extending upwardly therefrom, whereby the locking-rod clamps the cover upon the cylinder and the latter within a receptacle and the cover-section, 5, and smoke-pipe may be adjusted for access to the cylinder, substantially as described.

2. In a feed-cooker, a two-part cover provided on the upper faces of its sections with the raised flanges which are extended beyond the contiguous edges of said sections and overlap one another and the flanges on one cover-section having the notches forming the exposed seats, and a hinge-rod passing through lapping flanges and pivotally connecting the cover-sections together, in combination with a cylinder upon which the cover is seated, a locking-rod fitted to said seats, and means for attaching the locking-rod to a vessel, substantially as described.

3. In a feed-cooker, the combination with a cylinder, of a grate provided with the recess, 11, in one side thereof and with the depending feet, 12, which rest upon the cylinder and support the grate removably thereon, a sectional cover having one member secured upon the upper end of the cover and having its other member hinged to said fixed member, an air-inlet tube secured to the fixed cover member and depending within the cylinder for its lower extremity to pass through the recess in the grate, and a smoke-outlet pipe attached to the hinged cover member for adjustment therewith and extending above the cylinder and its cover, substantially as described.

In testimony that I claim the foregoing as my own I have hereto affixed my signature in the presence of two witnesses.

DAVID FORD.

Witnesses:
JOHN G. BROWN,
PALMER M. DEARING.